United States Patent [19]

Major, deceased et al.

[11] Patent Number: 4,479,667

[45] Date of Patent: Oct. 30, 1984

[54] ADJUSTABLE STANDPIPE APPARATUS FOR EVAPORATIVE COOLERS

[75] Inventors: Frederick A. Major, deceased, late of Tempe, Ariz.; Henry M. Woike, Apache Junction, Ariz.; Clare M. Major, executrix, 1725 E. Dr., Tempe, Ariz. 85282

[73] Assignee: Clare M. Major, Tempe, Ariz. ; Executrix for Frederick A. Major

[21] Appl. No.: 258,645

[22] Filed: Apr. 29, 1981

Related U.S. Application Data

[63] Continuation-in-part of Ser. No. 145,974, May 2, 1980, abandoned.

[51] Int. Cl.³ .............................................. F16L 35/00
[52] U.S. Cl. ...................... 285/39; 285/161; 285/169; 285/332; 285/332.3; 285/391; 285/423
[58] Field of Search ............... 285/391, 332, 158, 161, 285/423, 179, 39, 355, 169, 332.3, 260, 360, 326, 401; 403/194, 195, 196, 200, 238, 239

[56] References Cited

U.S. PATENT DOCUMENTS

| | | | |
|---|---|---|---|
| 1,645,032 | 10/1927 | Wilson | 285/391 X |
| 2,454,465 | 11/1948 | Leo et al. | 285/158 |
| 3,214,198 | 10/1965 | Peuchmaur | 285/355 X |
| 3,281,869 | 11/1966 | Schweigaard | 285/161 X |
| 3,404,540 | 10/1968 | Bryans et al. | 285/176 X |
| 3,540,757 | 11/1970 | Neber | 285/332 X |
| 3,749,424 | 7/1973 | Greene | 285/161 |
| 3,876,234 | 4/1975 | Harms | 285/423 X |
| 4,154,466 | 5/1979 | Simmons | 285/332.3 X |
| 4,212,335 | 7/1980 | Bova | 285/332 |

FOREIGN PATENT DOCUMENTS

| | | | |
|---|---|---|---|
| 730582 | 8/1932 | France | 285/158 |
| 1226512 | 7/1956 | France | 285/158 |
| 1126723 | 11/1956 | France | 285/390 |
| 1187059 | 3/1959 | France | 285/158 |
| 778858 | 7/1957 | United Kingdom | 285/355 |

Primary Examiner—Dave W. Arola
Attorney, Agent, or Firm—H. Gordon Shields

[57] ABSTRACT

Two pipes for low pressure water systems include a pair of tapering surfaces secured together by a threaded engagement in which the thread of one member extends helically for less than three hundred sixty degrees.

21 Claims, 10 Drawing Figures

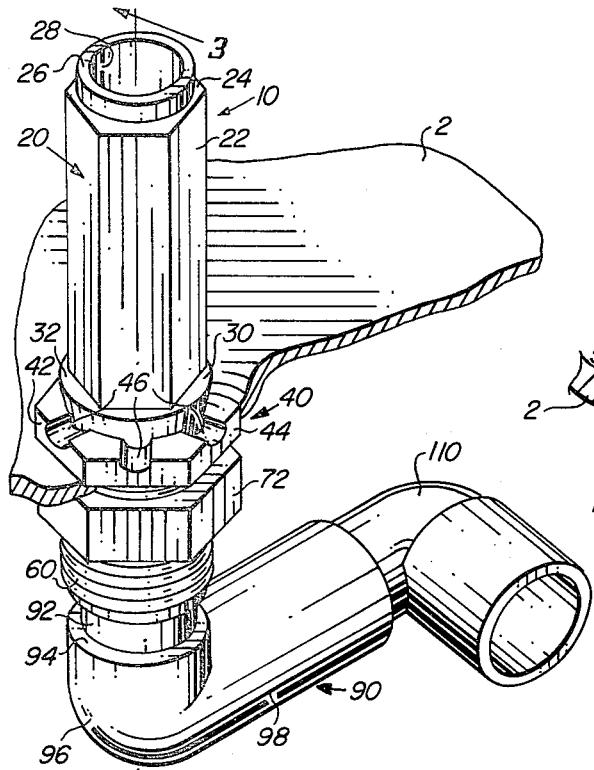
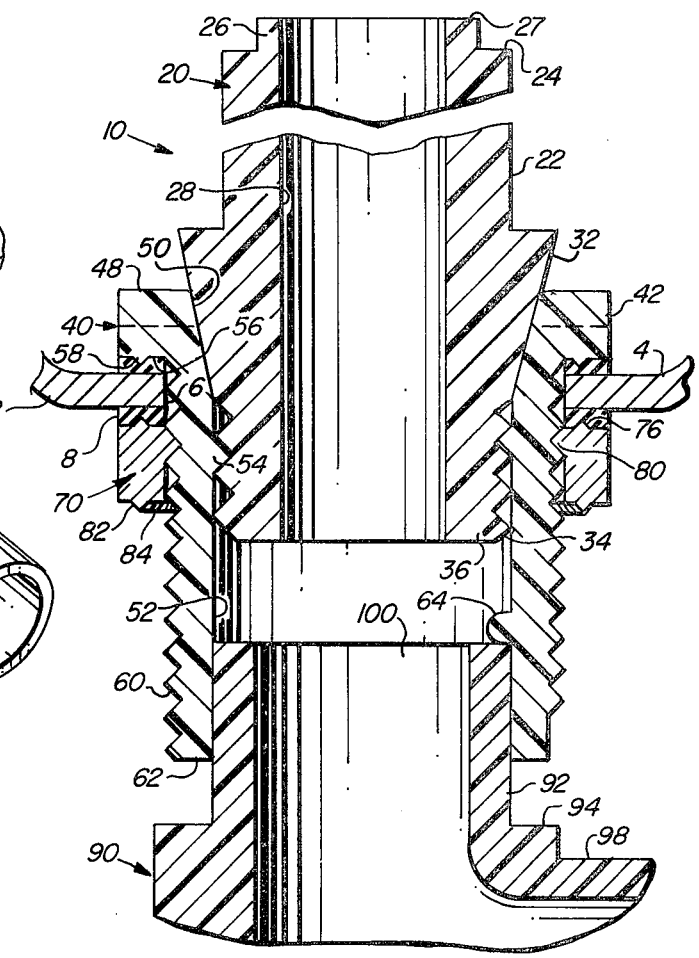
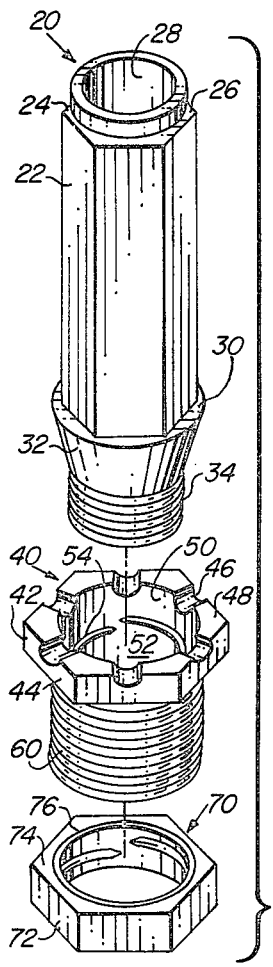
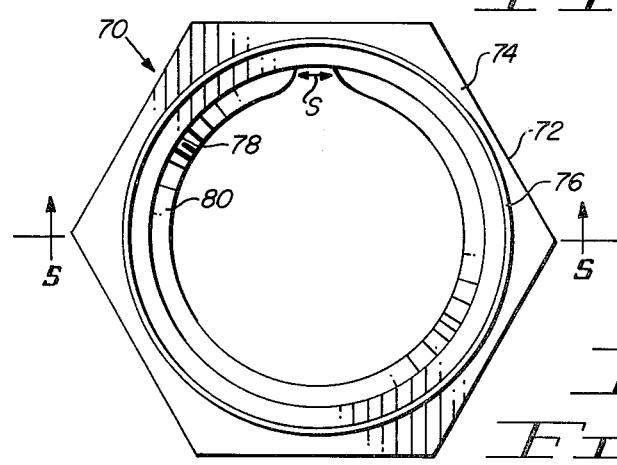
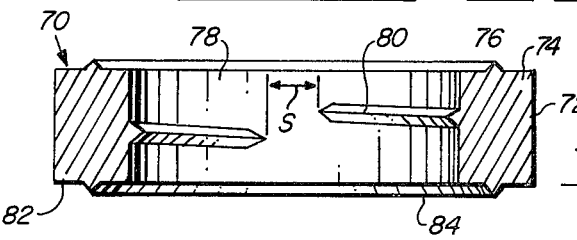

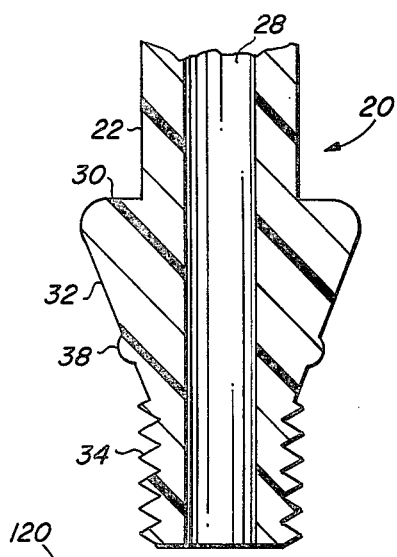
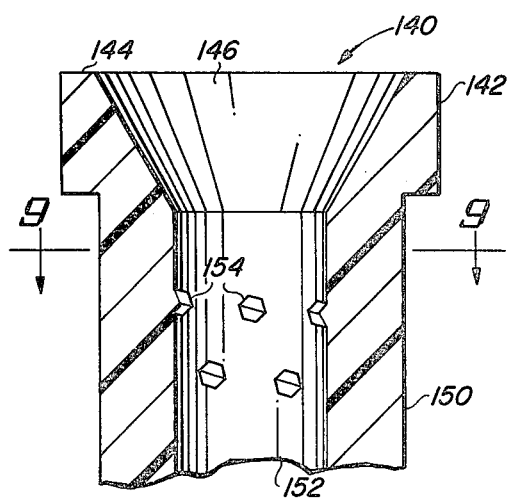
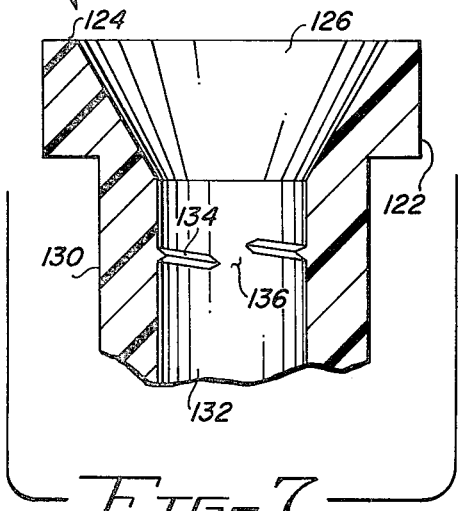
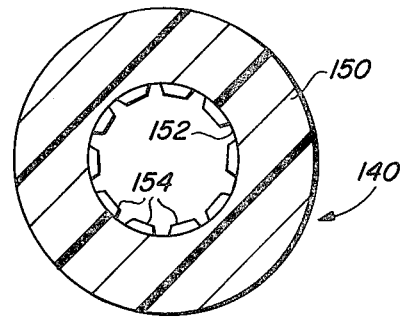
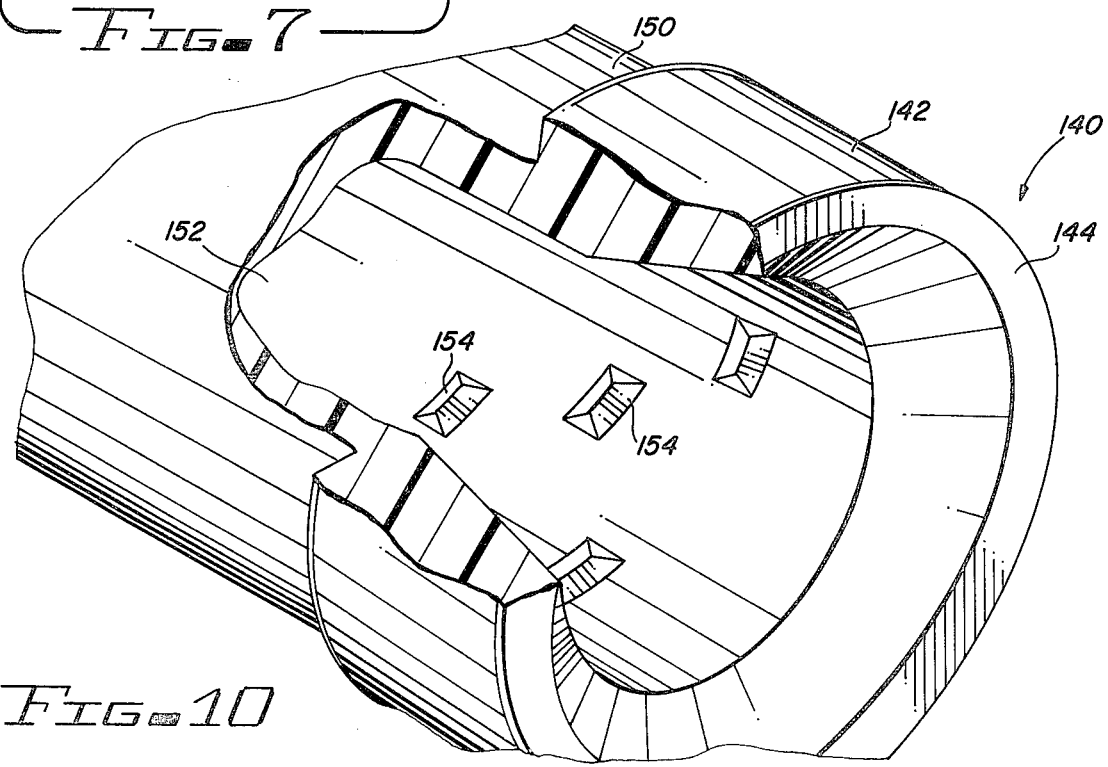

ADJUSTABLE STANDPIPE APPARATUS FOR EVAPORATIVE COOLERS

CROSS-REFERENCE TO RELATED APPLICATION

This application is a continuation-in-part application of copending application Ser. No. 145,974, filed May 2, 1980, now abandoned.

BACKGROUND OF THE INVENTION

1. Field of the Invention

This invention relates to the water-tight connection of pipes, and, more particularly, to the connection of pipes for low-pressure water systems.

2. Description of the Prior Art

Low pressure water systems, such as used in evaporative coolers, include various types of connections in the water system. For example, evaporative coolers include a reservoir usually connected to a standard water supply. Within the reservoir there is a standpipe to limit the height of the water within the reservoir. The standpipe is connected to the reservoir in a fluid-tight connection. There are many other types of systems which must be connected to a water supply through some type of water-tight connection. There are many other types of systems which must be connected to a water supply through some type of water-tight connection. Most apparatus requiring fluid-tight couplings include threaded fittings, or connections.

Threaded connections for water-tight conduits are typically made of brass, with machined threads externally and internally. A gasket is needed to insure that the threaded connection remains water-tight. Relatively expensive tooling, etc., is required.

Threaded connections may also be made of various types of plastic or polymer materials. External threads may be cut into molds and accordingly machining is not required. However, internal threads are difficult and relatively expensive to make.

A typical use application for a fluid-tight connection is found in evaporative cooler standpipes. The use of galvanized pipe is, or has, given away to the use of plastic pipe for such applications.

Evaporative coolers include a water reservoir and a pump in the reservoir that supplies water to soak cooler pads. The pumped water flows downwardly through the pads by gravity and the excess water returns to the reservoir. To maintain a predetermined amount of water in the reservoir, a source of water is connected to the reservoir. The height of the water in the reservoir is typically controlled by a float valve connected to the input source. However, the float valve may sometimes malfunction, and in such case, the input water keeps flowing into the reservoir, and an overflow pipe is used to drain away the excess water. When the water level reaches the top of the standpipe or overflow pipe, the excess flows into the overflow pipe, and into a hose generally connected to the pipe, which drains away the excess water.

The simplest form of the prior art comprises a vertically extending pipe secured to the bottom pan of an evaporative cooler. The pipe is of a predetermined length, and is simply threaded into some type of bushing or pipe fitting which is in turn connected to a hose. The hose allows the water flowing into the standpipe or overflow pipe to drain away from the evaporative cooler. The vertical height of the pipe is preferably fixed, but it is difficult to consistently provide for the same overflow level due to the threaded engagement of the pipe. Due primarily to the electrical components in the cooler, a predetermined and consistent maximum height or level of the water is highly desirable.

The problem of sealing the standpipes and of adjusting or determining the vertical height of the standpipes are problems which are very real. The threaded engagement of the mating pipes comprises the seal in the prior art. That is, the seal is dependent upon the threads of the pipe fittings.

Another problem is the economics of metal pipe versus plastic pipe. The cost of metal (galvanized steel) pipe, which resists the attack of the corrosive salts in the water, is greater than the cost of plastic pipe, which also is corrosion resistant. However, fabrication of internal threads in plastic pipe is an expensive process.

While plastic pipe has a general cost advantage over galvanized steel pipe, the cost involved in fabricating internal threads within the plastic pipe substantially decreases the attractiveness of plastic pipe as an alternative to galvanized steel pipe.

Another problem of the prior art is the inability to adapt overflow pipes to flat or shallow sloped roofs. If a hose is coupled directly to a pipe, there is a likelihood of kinking which prevents water from running through the hose, and thus blocks the overflow pipe.

The apparatus of the present invention is adaptable to rooofs of varying slopes, and solves the prior art problems of seals and threads, all with plastic material. Moreover, a substantially uniform height of the overflow pipe is consistently obtained.

Of primary importance in evaporative cooler standpipes is a water tight connection of the standpipe and any train line connected to it and a water tight connection with the evaporative cooler housing floor. A threaded connection is used to connect the several components together. In the apparatus of the present invention, both a tapered connection and an internal thread having less than a complete, helical thread length of less than three hundred sixty degrees are used. The parts or elements are made of a plastic or polymer material, amenable to molding techniques.

Threaded connections of various types, involving either a tapered connection or a thread of very few turns, or both, are shown in U.S. Pat. Nos. 2,454,465; 3,281,869; 3,404,540; 3,540,757; 3,749,424; 3,876,234; and 4,212,335.

SUMMARY OF THE INVENTION

The invention described and claimed herein comprises a pipe connection for an overflow pipe and a bushing into which the pipe fits and which includes tapered sections on both of the elements which fit together to effect a seal, and a lock nut having a shutoff type thread which comprises an internal helix of less than three hundred sixty degrees, and a street ell which is secured to the bushing.

Among the objects of the present invention are the following:

To provide new and useful overflow pipe apparatus;

To provide new and useful overflow pipe apparatus for an evaporative cooler system;

To provide new and useful standpipe apparatus having a street ell secured thereto;

To provide new and useful bushing having an internal thread of less than three hundred sixty degrees which mates with external threads;

To provide new and useful adjustable height standpipe apparatus;

To provide a new and useful pipe connection;

To provide a new and useful pipe connection having a pair of tapered surfaces;

To provide a new and useful internally threaded bushing; and

To provide a new and useful threaded connection.

BRIEF DESCRIPTION OF THE DRAWING

FIG. 1 is a perspective view of the apparatus of the present invention.

FIG. 2 is a perspective view of the apparatus of the present invention with the elements or components spaced apart from each other.

FIG. 3 is a view in partial section of the apparatus of FIG. 1, taken generally along line 3—3 of FIG. 1.

FIG. 4 is a top view of a portion of the apparatus of the present invention.

FIG. 5 is a view in partial section of the apparatus of FIG. 4, taken generally along line 5—5 of FIG. 4.

FIG. 6 is a fragmentary view in partial section of an alternate embodiment of a portion of the apparatus of the present invention.

FIG. 7 is a view in partial section of a pipe and a bushing spaced apart.

FIG. 8 is a view in partial section of an alternate embodiment of a bushing.

FIG. 9 is a view in partial section of the apparatus of FIG. 1, taken generally along line 9—9 of FIG. 8.

FIG. 10 comprises a perspective view, with a portion broken away, of the apparatus of FIGS. 8 and 9.

DESCRIPTION OF THE PREFERRED EMBODIMENT

FIG. 1 comprises a perspective view of overflow pipe apparatus 10 secured to a bottom or floor 2 of an evaporative cooler. FIG. 2 comprises an exploded perspective view of the overflow pipe apparatus 10 of FIG. 1, and FIG. 3 comprises a view in partial section of the overflow apparatus 10 of FIG. 1, taken generally along line 3—3 of FIG. 1. Included as a component of the overflow pipe apparatus 10 is a nut 70. FIG. 4 comprises a top view of the nut 70, and FIG. 5 is a view in partial section of the nut 70 taken generally along line 5—5 of FIG. 4. For the following general discussion, reference will be made to FIGS. 1, 2, and 3. For discussion of the nut 70, reference will be made to FIGS. 4 and 5 in addition to FIGS. 1, 2, and 3.

Included in the standpipe or overflow pipe apparatus 10 is an overflow pipe or tube 20 which is secured to and within a bushing 40. The bushing 40 is in turn secured to an aperture or hole in the floor 2 by a nut 70. Also secured to the bushing 40, but at the lower portion of the bushing, remote from the overflow pipe 20, and below the floor 2, is an ell 90. The ell is shown only in FIGS. 1 and 3, while the other components of the overflow pipe apparatus 10 are shown in FIGS. 2, 4, and 5 in addition to FIGS. 1 and 3.

The overflow pipe 20 has a hexagonal outer configuration 22, which comprises six vertically extending flats or panels, as best shown in FIGS. 1 and 2. The purpose of the hexagonal outer configuration of the overflow pipe 20 is to allow a wrench, or other appropriate tool, to maintain a hold or grip on the overflow pipe while the apparatus is being secured to the bushing 40.

At the upper portion of the overflow pipe 20 is a top shoulder 24. Extending above the top shoulder 24 is a cylindrical boss 20. The top shoulder 24 comprises a transition between the cylindrical boss 26 and the hexagonal outer portion 22. While the top shoulder 24 extends inwardly from the hexagonal portion 22 to the cylindrical boss 26, a lower shoulder 30 extends outwardly from the lower part of the hexagonal outer portion 22. The top shoulder 24 and the lower shoulder 30 are substantially parallel to each other, but spaced apart by the outer hexagonal portion 22.

An inwardly tapering portion 32, which is of a generally conical configuration, intersects the lower shoulder 30 and extends inwardly and downwardly therefrom. The conical tapered portion 32 extends inwardly and downwardly and terminates in an externally threaded portion 34. The external threads 34 in turn terminate at a bottom 36, best shown in FIG. 3. An interior cylindrical bore 28 extends the full length of the overflow pipe 20.

The bushing 40 includes an upper nut portion 42 and a lower threaded portion 60. The nut portion 42 includes six flats 44 which are connected to each other to define a hexagonal outer portion.

Extending downwardly from a top surface 48 of the nut portion 42 are a plurality of castellated grooves 46. The grooves 46 extend radially with respect to the nut portion of the bushing 40, and intersect the center portion of each of the flats 44, as best shown in FIGS. 1 and 2. The purpose of the castellations or grooves is to help drain the water through the bushing from the reservoir. The pan or floor 2 comprises the bottom of the reservoir, and the top 27 of the pipe 20 comprises the maximum water level of the reservoir. By removing the pipe 20 from the bushing 40, the reservoir may be drained. The castellations allow maximum drainage without removing the bushing 40 and nut 70. As indicated above, the hexagonal outer configuration of the pipe 20 allows the pipe to be conveniently held by a wrench, and likewise the bushing 40, for assembling and disassembling the pipe and bushing.

Parallel to the top surface 48 of the nut portion 42 is a bottom surface 56. An O-ring protrusion 58 extends outwardly (downwardly) from the bottom surface 56. The O-ring protrusion 58 is a circular protrusion which provides a seal against the top surface of a gasket 8, such as a washer or O-ring, disposed on the floor 2, as best shown in FIG. 3.

A tapered bore 50 extends downwardly and inwardly from the top surface 48 of the nut portion 42. The tapered bore 50 is of a generally conical configuration, and its taper is above twelve degrees. It receives and mates with the exterior conically tapered portion 32 of the overflow pipe 20, whose taper is about ten degrees. The interior conical portion 50 intersects with a central cylindrical bore 52. The cylindrical bore 52 is disposed primarily in the lower threaded portion 60. The unequal tapers intersect and seal just above the exterior threads 34 of the pipe 20.

The cylindrical bore 52 includes, at its upper portion, spaced apart slightly downwardly from, but adjacent to, the conically tapered portion 50, a lock thread 54. The lock thread 54 comprises a helically extending ridge on the interior bore 52 which receives the exterior threads 34 of the overflow pipe 20. The lock thread 54 comprises an interior thread which extends arcuately on the interior of the bore 52 slightly less than 360°. The lock thread 54 is thus free of axial overlap and is substantially similar to a lock thread 80 of the nut 70, which will be discussed in detail below, and which is illustrated in detail in FIGS. 4 and 5.

The lower threaded portion 60, and also the cylindrical interior bore 52, terminate in a bottom or lower end 62. It will be noted that the threads 60 extend from the bottom surface 56 of the nut portion 42 to the bottom or lower end 62.

As best shown in FIGS. 1 and 3, the overflow pipe 20 mates with the bushing 40. The lower threaded portion 34 of the overflow pipe 20, which threaded portion defines external threads, extends through the conically tapered bore 50 of the bushing 40 and into the cylindrical bore 52 of the bushing 40. The exterior threads 34 matingly engage the lock thread 54, which comprises the interior thread of the bushing 40. The bushing and the overflow pipe are then threaded together until the exterior conical portion 32 is secured against the interior conical bore 50 of the bushing 40. The mating engagement of the two conically tapered portions provides a positive seal between the overflow pipe 20 and the bushing 40.

In addition to the positive seal between the two elements, the taper lock defined by the juncture of the two conically tapered portions automatically establishes the same height of the overflow pipe, and thus obviates the necessity of a measurement to arrive at substantially the same height each time a unit is assembled. or each time a unit is disassembled, cleaned, and reassembled. Thus, the height of the overflow pipe 20 above the cooler pan floor 2 may be predetermined with substantial accuracy and without the necessity of measuring each time the overflow pipe apparatus 10 is assembled to an evaporative cooler, or to any other type of apparatus which requires a predetermined, relatively constant height for an overflow pipe.

The bushing 40, with the overflow pipe 20 secured thereto, is held in place in an aperture or hole 6 which extends through the floor 2 by a nut 70. The hole 6 is located in a dimple 4 which extends downwardly from the general plane of the pan or floor 2. The purpose of the dimple or recess is to expedite and/or simplify the draining of the water reservoir. As best shown in FIGS. 4 and 5, the nut 70 includes six exterior flats 72. The flats 72 comprise a hexagonal outer portion similar to the hexagonal outer configuration of the nut portion 42 of the bushing 40 and also of the outer configuration 22 of the overflow pipe 20. The hexagonal flats are the typical configuration used for nuts and bolts for convenience of use with an appropriate wrench. The size of the two hexagonal portions of the nut 70 and the nut portion 42 of the bushing 40 are substantially the same, thus allowing for the use of the same size wrench for securing the two elements together.

Above the flats 72 is a top surface 74, and at the bottom of the hex flats 72 is a lower or bottom surface 82. The top surface 74 and the bottom surface 82 are substantially parallel to each other. An O-ring protrusion 76 extends upwardly (outwardly) from the top surface 74 and an O-ring protrusion 84 extends outwardly (downwardly) from the bottom surface 82. The O-ring protrusions 76 and 84 are substantially identical to the O-ring protrusion 56, discussed above in conjunction with the bushing 40. The reason for having the two O-ring protrusions 76 and 84 on the nut 70 is simply for convenience in using the nut. With an O-ring protrusion extending outwardly from both top and bottom surfaces of the nut 70, the nut is substantially vertically symmetrical and accordingly can be used without requiring a particular orientation. The O-ring protrusions 58 and 76 are shown in FIG. 3 disposed against a pair of gaskets 8, making positive seals therewith, or with any similar appropriate flexible seal.

Within the nut 70 is an internal bore 78. The bore 78 is cylindrical and is accordingly substantially perpendicular to both the top and bottom surfaces 74 and 82, respectively. Extending inwardly with respect to the bore 78 is a helically extending lock thread 80. The lock thread 80 comprises an inwardly extending helical ridge which extends about the cylindrical bore 78 a total arcuate distance or length of slightly less than 360°. There accordingly is an arcuate space S between the respective ends of the lock thread 80, as may be seen in FIGS. 2, 4, and 5. The lock thread 80 is thus free of axial overlap.

The thread 80, which comprises an internal thread for the nut 70, engages the external threads 60 of the bushing 40 to secure the bushing to the pan 2. As best shown in FIGS. 1 and 3, the nut 70 is snugged against the bottom surface of the pan 2 to secure the bushing 40 and the overflow pipe 20 securely in place.

It will be noted that the use of the internal lock threads 54 and 80, which are less than 360° of arc in their respective bores, permits the internal threads to be conveniently molded integrally with their respective elements and without the necessity of spiral windings, and the like, which characterized internal threads on molded plastics of the prior art. Moreover, it will also be noted that the employment of the taper lock of the pipe and bushing eliminates the reliance or burden on the threads as a seal. Rather, the seal is effected by the mating engagement of the conically tapered portions of the overflow pipe and the bushing, as discussed above.

For adapting a water cooler to roofs of various slopes or pitches, and particularly with flat roofs or with roofs of a very shallow pitch, the street ell 90 is shown secured to the bottom of the bushing 40. The ell 90 includes a vertical cylindrical portion 92 which extends into the lower part of the interior cylindrical bore 52 of the bushing 40. A shoulder 94 is defined between the cylindrical portion 92 and an elbow 96. The elbow 96 comprises a 90° juncture between the cylindrical portion 92 and a horizontal cylindrical portion 98, best shown in FIG. 1. With the ell 90 is an interior bore 100. The bore 100 is continuous from the vertical cylindrical portion 92 through the elbow 96 and through the horizontal cylindrical portion 98, as best shown in FIG. 3.

It will be noted that the exterior configuration of the cylindrical portion 92 is smooth, and its exterior diameter is substantially the same as the interior diameter of the bore 52. Accordingly, a relatively tight fit occurs between the ell 90 and the bushing 40. Typically, the ell 90 may be cemented to the bushing 40.

As shown in FIG. 3, the interior bore 52 of the bushing 40 includes an interior protrusion 64. The protrusion or ridge 64 comprises a stop to limit the vertical height or distance within the bore 52 that the vertical cylinder 92 of the ell may extend. It will be noted that the ridge 64 has no effect on the mating engagement of the external and internal conical portions 32 and 50, respectively.

As shown in FIG. 1, another ell 110 may be secured to the street ell 90, for connection to a pipe, hose, or the like, to conduct away the water which flows into the overflow pipe 20 from the cooler pan 2 on which the overflow pipe apparatus 10 is secured.

As is well known and understood in the art, an evaporative cooler includes a reservoir of water on the bottom pan and a circulating pump which pumps the water upwardly. The water that is pumped vertically then falls by gravity through pads and the excess water is returned to the reservoir. The reservoir is in turn connected to a water source and the water source flows through a float controlled valve. The valve and float arrangement maintains the water level within the reservoir at a predetermined height. However, in case of a malfunction of the valve, or the like, an overflow pipe is connected to the reservoir to allow the excess water to flow out of the cooler reservoir. The overflow pipe apparatus extends through a hole in the bottom of the reservoir and accordingly must be sealed to prevent water from leaking away from the reservoir. In actuality, two seals are involved, one seal between the cooler and the overflow pipe, and a second seal internally of the overflow pipe.

With the apparatus of the prior art, seals depend primarily on the threads connecting the overflow pipe apparatus together. When the overflow pipe apparatus is to be made of plastic material, the integrity of the threaded seal is questionable. With the apparatus of the present invention, no dependency is made on a threaded seal. Rather, the threads are simply used to secure the various elements of the standpipe apparatus 10 together.

The seal between the elements comprises the mating and sealing engagement of the tapered portions 32 and 50, which is a positive seal held together by the threads. This also obviates the use of an O-ring or gasket between the elements (the pipe and the bushing) of the present invention.

With respect to the seal effected between the standpipe apparatus 10 and the cooler pan 2, a pair of washers 8, as shown in FIG. 3, or other appropriate flexible seal, may be used, as desired. The washers are disposed on opposite sides of the hole or aperture 6 of the pan 2, and about both the pipe 20 and bushing 40. Actually, the lower portion of the bushing 40, below the nut portion 42 and comprising the external threads 60, extends through both washers. The pipe 20 is in turn secured to the bushing 40. A positive contact with the seal is effected by the protrusions on both the bushing 40 and the nut 70. The protrusions make positive contact with the flexible seals throughout a full 360° by putting a positive pressure on them.

For insuring the integrity of the seal between the tapered bore 50 of the bushing 40 and the tapered portion 32 of the pipe 20, it may be desirable to provide an integral peripherally extending sealing element 38 on the tapered portion 32 of the pipe 20. The sealing element 38 is shown in FIG. 6, which comprises a fragmentary view in partial section of a portion of the pipe 20. The sealing element 38 comprises a ridge which extends outwardly and circumferentially or circularly about or on the periphery of the taper 32. The sealing element 38 is preferably disposed or located toward the lower end of the tapered portion 32, spaced slightly above the juncture of the threads 34 and the tapered portion 32.

The sealing element 38 acts as an integral O-ring with respect to the sealing engagement between the mating tapers 32 and 50. The sealing element 38 need not extend or protrude outwardly very far from the conically configured tapered portion 32 in order to effectively perform the function of sealing the bushing and the pipe together at their tapered portions. Rather, it need only extend outwardly a relatively slight distance. Accordingly, it is preferably simply an outwardly extending protrusion which extends circumferentially about the tapered portion 32.

An advantage to having an integral sealing element such as the sealing element 38, rather than a groove and a separate O-ring, is the reduction in parts. Moreover, an integral sealing element does not require the extra step of inserting an O-ring into a groove. Furthermore, the inherent characteristics of the material out of which the standpipe is made lends itself very well to the use of an integral sealing element extending outwardly, as does the element 38, and thereby makes a sealing engagement when the bushing and the pipe are mated together. The pressure of the nut on the external threads of the standpipe provides sufficient force to maintain the sealing engagement between the bushing and the integral seal of the pipe. However, a peripheral groove and an O-ring inserted into the groove may be used as a sealing element, if desired.

While the sealing element 38 is shown in FIG. 6 as being generally rounded, the particular configuration of the element is not critical. The cross-sectional configuration accordingly may be rounded convexly as shown in FIG. 6, or it may be triangular in cross-sectional configuration, or it may have any other appropriate configuration.

FIG. 7 comprises a view in partial section of a pipe 20 and a bushing 120. The bushing and the pipe are spaced apart from each other, as if in preparation for securing the two elements together. The pipe 20 is disposed above the bushing 120, in preparation for its threaded portion 34 to mate with the bushing 120.

The pipe 20 is substantially as described above, particularly in conjunction with FIG. 6, which illustrates the external seal 38. The seal 38 comprises an integral O-ring disposed on the conically tapered portion 32 of the pipe 20. The O-ring 38 is integral with the tapered portion 32 and thus extends outwardly therefrom. When the threads 34 of the pipe 20 are secured to internal threads within the bushing 120, the integral O-ring 38 helps to insure a water-tight seal between the pipe 20 and the bushing 120.

The bushing 120 may be similar to the bushing 40, described above in conjunction with FIGS. 1-3. However, it may be simply a bushing for connecting two lengths of tubing (or pipe) together, with or without external threads. For purposes of FIG. 7, external threads have been omitted from the bushing 120.

The bushing 120 includes an upper, hexagonal nut portion 122 and a lower, stem portion 130. The hexagonal nut portion 122 is generally wider than the lower, stem portion 130. The external configuration of the upper portion 142 is substantially as shown and described above, particularly as shown and discussed in conjunction with FIG. 2, except that the nut portion 122 need not include the castellated groove 46 for purposes of using the bushing 120 as a connector.

A tapered bore 126 extends downwardly and inwardly from an upper surface 124 of the upper, hex nut portion 122 of the bushing 120. The bore 126 extends downwardly and inwardly to join an internal bore 132 which extends through the stem 130 of the bushing 120. The bore 132 is generally cylindrical in configuration. An internal thread 134 extends outwardly into the bore 132. The internal thread 134 is a lock thread, substantially identical to the lock threads 54 and 80 discussed above in conjunction with the embodiments of FIGS. 1-5. The thread 134 extends helically with respect to the bore 132 and is less, circumferentially, than 360°, thus defining a gap or space 136 between the opposite ends of the helical thread 134. It will be noted that the space 136 is offset axially due to the helical nature of the thread 134. The thread 134 is substantially the same as the thread 54 of the bushing 40 and as the thread 80 of the nut 70 of FIGS. 4 and 5.

For joining the pipe 20 and the bushing 120, the external threads 34 at the lower end of the tapering, conical portion 32 of the bushing 20 is inserted through the tapered portion 134 of the bushing 120 and into the bore 132. A mating engagement between the internal thread 134 and the external threads 34 is accomplished in a normal, well-known manner.

The angular extent or external taper of the conical portion 32 is not the same as the angular extent or taper of the bore 126. Measuring upwardly from the horizontal, the angle of the taper of the conical portion 32 is greater than that of the bore 126. Measuring from the vertical, the tapered portion 126 is at a greater angle than the tapered portion 32. The tapered portion 32 accordingly will be drawn downwardly deeper into the bushing 120 to cause an even tighter seal as relative rotation between the pipe 20 and the bushing 120 is effected. It will be noted, as discussed above, that the hexagonal outer configuration 22 of the pipe 20 and the hexagonal configuration of the upper portion 122 of the bushing 120 lend themselves well to the use of appropriate wrenches for securing the pipe 20 and the bushing 120 together.

As the pipe 20 is threaded into the bushing 120, the seal 38 is drawn into a tight, sealing engagement with the tapered bore 126 of the bushing 120 as the tapers 126 and 32 are drawn together. A fluid-tight connection between the pipe and the bushing results.

FIG. 8 is a view in partial section of an alternate embodiment 140 of the bushing 120. A bushing 140 is shown in partial section in FIG. 8 with substantially the same outer configuration as the bushing 120. The bushing 140 includes an upper portion 142 which is preferably of a hexagonal outer configuration to accommodate an appropriate wrench for securing the bushing 140 to a pipe or stem, such as to the pipe 20. The upper, hexagonally configured portion 142 includes an upper surface 144 and an inwardly and downwardly extending conically tapered portion 146.

Beneath the upper portion 142 is a stem 150. The stem 150 includes a cylindrical bore 152 which is connected to the conical portion 146 and extends downwardly therefrom. Within the cylindrical bore 152 is a plurality of thread portions 154. The thread portions 154 extend in a discontinuous manner along the bore 152. The thread portions 154, while discontinuous, are helically arranged and aligned with each other to produce the effect of a continuous thread of greater than 360°. However, the thread portions 154 are spaced apart vertically and angularly to provide a discontinuity within the bore 152 the thread portions 152 and 154 are also free of axial overlap. The discontinuity is shown best in FIG. 9, which comprises a view in partial section of the stem 150 of the bushing 140, taken generally along line 9—9 of FIG. 8. FIG. 10 comprises a perspective view of the bushing 140, in partial section, with a portion broken away, illustrating a discontinuity of the thread portions 154 in the bore 152.

The thread segments 154 extend inwardly with respect to the bore 152, and are spaced apart from each other circumferentially so that there is a slight gap between each segment, as viewed from the top or the bottom of the bushing 140, with respect to the bore 152. This is best shown in FIG. 9. The overall helical extent of the thread 154 may provide the effect of several continuous threads, such as two or three threads, depending on the linear extent of each thread segment or element and the desired spacing between the elements.

The effect of the discontinuity with respect to the thread elements 154 produces substantially the same overall result for the embodiment of FIGS. 8 and 9 as is produced by the continuous lock thread 134 of FIG. 7 and the continuous lock threads 54 and 80 of FIGS. 1-5, as discussed above. However, the advantage of the embodiment of the apparatus of FIG. 9 over that of FIG. 7, and of the other, continuous thread elements, is that less than a single helical thread is produced by the apparatus shown in FIGS. 1-5 and 7, while the effect of more than one, or two or three, threads, axially, is produced by the bushing of FIGS. 8 and 9. However, the internal thread of the bushing or nut is amenable to molding techniques for mass production purposes, which is generally not possible with internal threads of the prior art.

It will be noted that in FIGS. 8 and 9 a bushing 140 is illustrated. However, the same type of discontinuous internal thread portions 154 are applicable to the nut, such as illustrated in FIGS. 4 and 5, as compared with the single, continuous thread 80 illustrated therein. The overall effect of the lock thread of less than a single, 360° extent is still applicable, whether the internal thread be in a nut or in a bushing.

Referring again to FIGS. 2, 3, 6, and 7, it will be noted that the threads 34 on the lower stem of the pipe 20 begin at the lower portion of, and adjacent to, the exterior conical portion of the pipe. Depending on the placement of the interior thread on the bore of the bushing or nut to which the pipe is to be secured, the longitudinal extent of the exterior threads on the lower stem of the pipe may or may not be of substantial importance. For example, it will be noted that in the bushings illustrated in FIGS. 2, 3, 7, and 8, and in the nut illustrated in FIGS. 4 and 5, the interior thread is disposed within the cylindrical bores downwardly from the top of the bore. In the case of the bushings, the thread is spaced downwardly from the internal conical portion. With respect to the nut of FIGS. 4 and 5, the internal thread is about centered in the bore of the nut.

With respect to the bushings, if the internal thread were located closer to the juncture of the internal conical portion in the cylindrical bore, the extent of the exterior threads on the mating pipe stem would be of more importance, even to the extent of becoming of prime importance with respect to the securing of the pipe and the bushing together. Since in each case, as illustrated in the Figures, the internal thread extends for a total circumferential distance of less than 360°, the entire thread, or all of the thread segments or elements, as in the embodiment of FIGS. 8 and 9, must preferably be engaged with the exterior threads of the mating pipe. The exterior threads on the mating pipe should extend a sufficient axial length to fully engage the interior thread segments for properly securing the two mating elements together.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Overflow pipe apparatus for installation through an aperture in a floor of a pan to allow fluid to flow out of the pan, comprising, in combination:
   pipe means, including
      a first portion extending upwardly from the floor of the pan,
      a second portion extending downwardly from the floor of the pan and having first exterior threads,
      a first conical portion disposed between the first portion and the second portion, and
      a first bore extending through the first portion, the first conical portion, and the second portion through which liquid flows out of the pan;
   bushing means extending through the aperture in the floor and secured to the pipe means, including
      a second conical portion for matingly engaging the first conical portion of the pipe means,
      a lower portion extending downwardly through the aperture in the floor and having second exterior threads,
      an outwardly extending portion disposed on the floor of the pan about the aperture,
      a second bore extending through the second conical portion and the lower portion and communicating with the first bore for receiving the liquid from the pipe means, and
      first interior thread means in the second bore for engaging the first exterior threads of the pipe means to secure the pipe means to the bushing means; and
   nut means for securing the bushing means to the floor of the pan, including
      a third bore for receiving the lower portion of the bushing means, and
      second interior thread means for engaging the second exterior threads of the bushing means.

2. The apparatus of claim 1 in which the first portion of the pipe means includes a first hexagonal outer configuration adapted for gripping by a tool.

3. The apparatus of claim 1 in which the first interior thread means of the bushing means comprises a lock thread extending helically in the second bore a distance of less than 360°.

4. The apparatus of claim 1 in which the second interior thread means of the nut means comprises a lock thread extending helically in the third bore a distance of less than 360°.

5. The apparatus of claim 1 in which the nut means includes a second hexagonal outer configuration adapted for gripping by a tool for securing the nut means to the businng means.

6. The apparatus of claim 1 in which the bushing means includes a third hexagonal portion adapted for gripping by a tool for securing the bushing means to the pipe means.

7. The apparatus of claim 1 in which the bushing means includes a nut portion comprising a flange extending outwardly from the second conical portion and above the lower portion.

8. The apparatus of claim 7 in which the bushing means further includes a circular protrusion extending downwardly from the nut portion for contacting a flexible seal disposed on the floor about the aperture.

9. The apparatus of claim 8 in which the nut portion of the bushing means further includes a third hexagonal portion adapted for gripping by a tool for securing the bushing means to the pipe means.

10. The apparatus of claim 4 in which the nut means includes a circular protrusion for contacting a flexible seal disposed about the lower portion of the bushing means and against the floor about the aperture.

11. The apparatus of claim 1 in which the bushing means includes an ell having
    a vertical cylindrical portion disposed in the second bore,
    an elbow secured to the vertical cylinder portion,
    a horizontal portion secured to the elbow, and
    a fourth bore extending through the vertical cylindrical portion, the elbow, and the horizontal portion and communicating with the second bore for receiving the liquid from the second bore.

12. The apparatus of claim 1 in which the pipe means includes seal means disposed on the first conical portion.

13. The apparatus of claim 12 in which the seal means comprises a sealing element extending circumferentially about the first conical portion for sealingly engaging the second conical portion of the bushing means.

14. The apparatus of claim 12 in which the seal means is integral with and extends outwardly from the first conical portion.

15. Pipe connector apparatus, comprising, in combination:
    first pipe means, including
       an exterior conical portion,
       a stem having exterior threads extending continuously for more than 360° disposed adjacent to the exterior conical portion;
    second pipe means, including
       an interior conical portion for receiving the exterior conical portion of the first pipe means,
       a bore disposed adjacent to the interior conical portion for receiving the stem of the first pipe means, and
       discontinuous thread means in the bore for receiving the exterior threads of the stem of the first pipe means for urging the two conical portions into a sealing engagement with each other and for securing the first and second pipe means being free of axial overlap and together, the discontinuous thread means including a total arcuate extent in the bore of less than 360°.

16. The apparatus of claim 15 in which the first pipe means includes seal means disposed on the exterior conical portion.

17. The apparatus of claim 16 in which the seal means extends circumferentially about the exterior conical portion adjacent to the stem.

18. The apparatus of claim 15 in which the discontinuous thread means comprises a thread extending helically for less than three hundred sixty degrees.

19. The apparatus of claim 15 in which the discontinuous thread means comprises a plurality of spaced apart thread segments.

20. The apparatus of claim 19 in which the plurality of spaced apart thread segments extend helically in the bore and comprise more than a single thread.

21. The apparatus of claim 20 in which the plurality of spaced apart thread segments are aligned helically and are spaced apart vertically.

* * * * *